(12) United States Patent
Hufnagl et al.

(10) Patent No.: US 8,979,453 B2
(45) Date of Patent: *Mar. 17, 2015

(54) BLIND FASTENER

(71) Applicant: Alcoa Inc., Pittsburgh, PA (US)

(72) Inventors: Gerhart Hufnagl, Tucson, AZ (US);
Douglas DeSalvo, Tucson, AZ (US)

(73) Assignee: Alcoa Inc., Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/055,559

(22) Filed: Oct. 16, 2013

(65) Prior Publication Data

US 2014/0044498 A1    Feb. 13, 2014

Related U.S. Application Data

(63) Continuation-in-part of application No. 13/860,944, filed on Apr. 11, 2013, now Pat. No. 8,777,533.

(60) Provisional application No. 61/625,235, filed on Apr. 17, 2012.

(51) Int. Cl.
*F16B 13/06* (2006.01)
*F16B 19/10* (2006.01)

(52) U.S. Cl.
CPC ......... *F16B 19/1054* (2013.01); *F16B 19/1072* (2013.01)
USPC ................................. 411/55; 411/34; 411/42

(58) Field of Classification Search
USPC .......................................... 411/34, 42, 55, 43
See application file for complete search history.

(56) References Cited

U.S. PATENT DOCUMENTS

| | | | | |
|---|---|---|---|---|
| 2,863,351 A | | 12/1958 | Vaughn | |
| 2,971,425 A | * | 2/1961 | Blakeley | 411/28 |
| 3,107,572 A | * | 10/1963 | Orloff | 411/34 |
| 3,277,771 A | * | 10/1966 | Reynolds | 411/39 |
| 3,345,900 A | * | 10/1967 | Villo | 411/41 |
| 3,443,474 A | * | 5/1969 | Bergere et al. | 411/41 |
| 3,866,998 A | * | 2/1975 | Iantorno | 439/870 |
| 4,312,613 A | * | 1/1982 | Binns | 411/34 |
| 4,659,271 A | * | 4/1987 | Pratt et al. | 411/43 |
| 4,832,548 A | | 5/1989 | Strobel | |
| 4,950,115 A | * | 8/1990 | Sadri | 411/38 |

(Continued)

OTHER PUBLICATIONS

International Search Report and Written Opinion mailed on Jul. 18, 2013 in connection with International Application No. PCT/US2013/036129 (10 pages).

(Continued)

*Primary Examiner* — Roberta Delisle
(74) *Attorney, Agent, or Firm* — Greenberg Traurig, LLP

(57) ABSTRACT

A blind fastener including a pull-type core bolt having a shank with a head, and a sleeve having an elongated body with a head, and a tapered notch formed within an exterior surface thereof and defined by a tapered portion having a slope and a frictional enhanced surface. The core bolt is installed within the sleeve. During installation of the fastener within the plurality of work pieces, an axial force is applied to the core bolt the head of the core bolt engages the sleeve, and a bulb is formed on the elongated body of the sleeve, the bulb defining a portion of a bulbed portion. When a selected axial force is reached, the bulbed portion separates from the elongated body and engages axially the tapered portion of the sleeve, increasing the diameter of the bulb which engages a blind side of one of the work pieces.

20 Claims, 9 Drawing Sheets

(56) References Cited

U.S. PATENT DOCUMENTS

| | | | |
|---|---|---|---|
| 5,498,110 A * | 3/1996 | Stencel et al. | 411/43 |
| 5,634,751 A | 6/1997 | Stencel et al. | |
| 5,816,761 A * | 10/1998 | Cassatt et al. | 411/34 |
| 6,036,418 A | 3/2000 | Stencel et al. | |
| 6,213,698 B1 | 4/2001 | Cosenza | |
| 7,308,842 B2 | 12/2007 | Hufnagl et al. | |
| 8,297,898 B2 | 10/2012 | Schewerda | |
| 8,322,015 B2 | 12/2012 | Pratt et al. | |
| 8,348,566 B2 | 1/2013 | Pratt | |
| 2009/0053006 A1 | 2/2009 | Hufnagl | |
| 2010/0074710 A1 | 3/2010 | Auriol et al. | |

OTHER PUBLICATIONS

Huck Fasteners, An Alcoa business, 3724 East Columbia Street, Tucson, AZ 85714 BLIND BOLT Engineering Standard Diagram No. UAB100-EU, SK12771, Issued Dec. 8, 2001; 4 pages.

Huck Fasteners, An Alcoa business, 3724 East Columbia Street, Tucson, AZ 85714 BLIND BOLT Engineering Standard Diagram No. UAB100-MV, SK12772, Issued Dec. 13, 2001; 3 pages.

Huck Fasteners, An Alcoa business, 3724 East Columbia Street, Tucson, AZ 85714 BLIND BOLT Engineering Standard Diagram No. UABP-EU, SK12756, Issued Sep. 20, 2001; 4 pages.

Alcoa Fastening Systems, 3724 East Columbia Street, Tucson, AZ 85714 BLIND BOLT Engineering Standard Diagram No. UAB130-EU, SK12711, Issued Jan. 31, 2001; 4 pages.

Alcoa Fastening Systems, 3724 East Columbia Street, Tucson, AZ 85714 BLIND BOLT Engineering Standard Diagram No. UAB130-MV, SK12742, Issued Jul. 12, 2001; 3 pages.

Alcoa Fastening Systems, 3724 East Columbia Street, Tucson, AZ 85714 BLIND BOLT Engineering Standard Diagram No. UAB6127-EU, SK12770, Issued Dec. 8, 2001; 3 pages.

Alcoa Fastening Systems, 3724 East Columbia Street, Tucson, AZ 85714 BLIND BOLT Engineering Standard Diagram No. OUAB130-EU, SK12801, Issued Apr. 19, 2004; 4 pages.

Alcoa Fastening Systems, 3724 East Columbia Street, Tucson, AZ 85714 BLIND BOLT Engineering Standard Diagram No. OUAB6127-EU, SK12802, Issued Apr. 19, 2004; 3 pages.

Alcoa Fastening Systems, 3724 East Columbia Street, Tucson, AZ 85714 BLIND BOLT Engineering Standard Diagram No. OUABP-EU, SK12803, Issued Apr. 19, 2004; 4 pages.

* cited by examiner

US 8,979,453 B2

BLIND FASTENER

CROSS-REFERENCE TO RELATED APPLICATION

This application is a continuation-in-part of U.S. application Ser. No. 13/860,944 entitled "BLIND FASTENER", filed Apr. 11, 2013, which claims the benefit of U.S. Provisional Application No. 61/625,235 entitled "BLIND FASTENER," filed Apr. 17, 2012, the entireties of which are incorporated herein by reference.

FIELD OF THE INVENTION

The present invention relates to a fastener and, more particularly, a blind fastener for securing work pieces together,

BACKGROUND OF THE INVENTION

Blind fasteners are commonly used to secure a plurality of work pieces together when it is difficult or impossible to access the blind side of one of the work pieces. In certain applications, it is desirable that bulbed sleeves used in conjunction with such fasteners have relatively large footprints that engage the blind side of the one of the work pieces.

SUMMARY

In an embodiment, a fastener includes a core bolt having an elongated shank with a first end, a second end opposite the first end, a head located at the second end, and a pull portion located at the first end, the pull portion having a plurality of grooves; and a sleeve having an elongated body with a first end, a second end opposite the first end of the elongated body, an exterior surface extending from the first end of the elongated body to the second end of the elongated body, a head located at the first end of the elongated body, and a tapered notch formed within the exterior surface intermediate the first and second ends of the elongated body and defined by a tapered portion, wherein the core bolt is adapted to be installed within the sleeve such that the head of the core bolt is juxtaposed with the second end of the elongated body of the sleeve, wherein the fastener is adapted to be installed within a plurality of work pieces such that the head of the sleeve engages an accessible side of one of the plurality of work pieces, and the second end of the elongated body of the sleeve extends from a blind side of another of the plurality of work pieces, wherein during installation of the fastener within the plurality of work pieces, a bulb is formed on the elongated body of the sleeve, the bulb defining a portion of a bulbed portion which extends from the bulb to the second end of the elongated body of the sleeve, wherein when a selected axial force applied to the fastener is reached, the bulbed portion separates from the elongated body and thereafter engages the tapered portion axially and in a direction towards the first end of the elongated body, thereby increasing the diameter of the bulb, and wherein when the fastener is in an installed position, the bulb engages the blind side of the another of the plurality of work pieces.

In an embodiment, the core bolt includes a breakneck groove located intermediate the first and second ends. In an embodiment, the bulb is formed prior to the separation of the bulbed portion from the elongated body. In an embodiment, the sleeve includes an annealed portion to facilitate formation of the bulb. In an embodiment, the bulbed portion is adapted to separate from the elongated body proximate to the tapered notch. In an embodiment, the tapered portion includes a frictional enhanced surface that is adapted to inhibit rotation of the bulbed portion relative to the elongated body after the bulbed portion separates from the elongated body. In an embodiment, the frictional enhanced surface includes knurling. In an embodiment, the frictional enhanced surface includes abrading. In an embodiment, the frictional enhanced surface includes a plurality of notches.

In an embodiment, the tapered portion has a slope in a range of about 5 degrees to about 30 degrees. In an embodiment, the tapered portion has a slope of about 5 degrees. In an embodiment, the tapered portion has a slope of about 10 degrees, In an embodiment, the tapered portion has a slope of about 15 degrees. In an embodiment, the tapered portion has a slope of about 20 degrees. In an embodiment, the tapered portion has a slope of about 25 degrees. In an embodiment, the tapered portion has a slope of about 30 degrees.

In an embodiment, the bulb includes a diameter that is at least one and one-half times a diameter of the fastener. In an embodiment, the bulb includes a diameter that is at least two times a diameter of the fastener.

In an embodiment, the fastener includes a lock ring, and wherein the head of the sleeve includes a pocket formed therein, the pocket being sized and shaped to receive the lock ring therein, wherein the core bolt includes a lock groove that is sized and shaped to receive the lock ring when the fastener is in its installed position. In an embodiment, the elongated body of the sleeve is adapted to absorb a peak buckling load during installation of the blind fastener, thereby minimizing indentations in at least one of the plurality of work pieces.

DETAILED DESCRIPTION OF THE DRAWINGS

Figure 1:
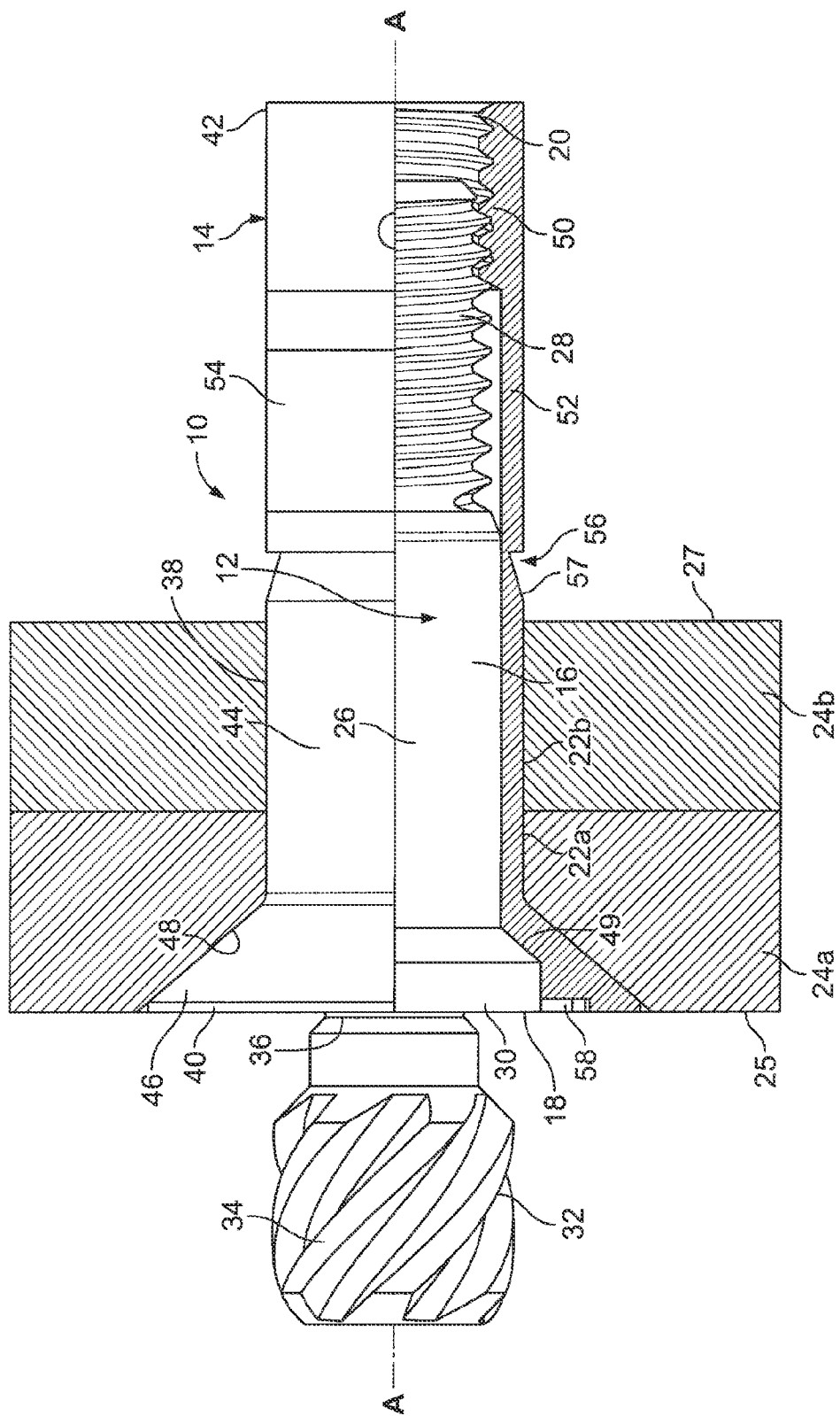
FIG. 1 is a partially cross-sectioned, side elevational view of a blind fastener in accordance with an embodiment, the fastener being shown in an uninstalled position within a plurality of work pieces and at a maximum grip length.

FIG. 1 illustrates an embodiment of a blind fastener 10. In an embodiment, the fastener 10 includes a core bolt 12 and a cylindrical sleeve 14 that is sized and shaped to receive the core bolt 12. In an embodiment, the sleeve 14 is of one-piece construction when the fastener 10 is within an initial stage of an uninstalled position. In an embodiment, the sleeve 14 is adapted to be separated into two portions or segments, which will be described in greater detail below. In an embodiment, the core bolt 12 includes an elongated shank 16 having a first end 18 and a second end 20 opposite the first end 18, and which is sized and shaped to extend through the sleeve 14. In an embodiment, the sleeve 14 is sized and shaped to be inserted within openings 22a, 22b of a plurality of work pieces 24a, and 24b, respectively. In an embodiment, the workpiece 24a includes an accessible side 25, while the workpiece 24b includes a blind side 27 opposite the accessible side 25. In certain embodiments, the work pieces 24a, 24b are made of aluminum, an aluminum alloy, other metallic alloys, composites, or combinations thereof.

In an embodiment, the shank 16 includes a smooth cylindrical portion 26 and a threaded portion 28 located at the second end 20 of the shank 16. In an embodiment, the threaded portion 28 of the shank 16 includes a diameter that is less than a diameter of the smooth portion 26 of the shank 16. In an embodiment, the core bolt 12 includes a first head 30 located at the first end 18 of the shank 16 and adjacent to the smooth portion 26. In an embodiment, the first head 30 is frustoconical in shape, In an embodiment, adjacent to the first head 30 and also forming a portion of the core bolt 12 is a frangible, second head 32. In an embodiment, the second head 32 includes splines or threads 34 that are engageable by a suitable driver attached to an installation tool (not shown in the Figures). In an embodiment, the first and second heads 30, 32 are formed integrally. In an embodiment, intermediate the first and second heads 30, 32 is a breakneck groove 36 that defines the weakest point of the core bolt 12. In an embodiment, the second head 32 is adapted to fracture torsionally or rotationally and separate from the first head 30 at the breakneck groove 36 in torsional/rotational shear in response to the rotational force applied to second head 32 after the fastener 10 has been installed in the work pieces 24a, 24b, thereby providing the core bolt 12 with a flush configuration relative to the sleeve 14 after the fastener 10 has been set. In certain embodiments, the core bolt 12 may have a structure and function such as any one of the pin members disclosed in U.S. Pat. No. 6,868,757 (the "'757 patent) and U.S. Pat. No. 7,308, 842 (the "'842 patent"), both of which are incorporated herein by reference in their entireties.

Still referring to FIG. 1, in an embodiment, the sleeve 14 includes an elongated body 38 having a first end 40 and a second end 42 opposite the first end 40. In an embodiment, the body 38 has a cylindrical shape and a smooth exterior surface 44. In certain embodiments, the body 38 has a diameter that provides a slight clearance fit or a press fit through the openings 22a, 22b of the work pieces 24a, 24b. In an embodiment, the sleeve 14 includes a head 46 at the first end 40 of the body 38. In an embodiment, the head 46 of the sleeve is sunk flush with an outer surface 48 of the accessible side 25 of the workpiece 24a. In another embodiment, the head 46 protrudes from the outer surface 48 of the accessible side 25 of the workpiece 24a. In an embodiment, the head 46 may include a round head, hex head or other suitable shape that is well known in the fastener art. In an embodiment, the head 30 of the core bolt 12 is adapted to sit on an annular, outwardly facing seat 49 on the head 46 of the sleeve 14. In an embodiment, the seat 49 is frustoconical in shape and complementarily tapered to that of the head 30 of the core bolt 12 so that the core bolt 12 is countersunk into the sleeve 14.

With continued reference to FIG. 1, in an embodiment, the sleeve 14 has an internal threaded portion 50 located at the second end 42 of the sleeve 14 and an internal smooth portion 52 juxtaposed with the threaded portion 50 and extending intermediate the first and second ends 40, 42. In an embodiment, the internal threaded portion 50 is adapted to engage threadedly the threaded portion 28 of the core bolt 12. In an embodiment, the internal threaded portion 50 of the sleeve 14 has a thickness that is greater than a thickness of the internal smooth portion 52 of the sleeve 14. In an embodiment, a plastic insert is located between the threaded portion 28 of the core bolt 12 and the internal diameter of the sleeve 14 (not shown in the Figures). In an embodiment, an annealed portion 54 on the body 38 of the sleeve 14 is locally induction annealed in order to facilitate formation of a bulb 55, which will be described below in further detail. In an embodiment, the annealed portion 54 additionally facilitates formation of the bulb 55 against the surface of the blind side 27 of the workpiece 24b in all grip ranges of the fastener 10. In another embodiment, the body 38 of the sleeve includes a tapered wall, which could be a tapered inner wall or a tapered outer wall (not shown in the Figures).

Still referring to FIG. 1, in an embodiment, the exterior surface 44 of the sleeve 14 includes a tapered notch 56 formed therein and located intermediate the first and second ends 40, 42 of the sleeve 14. In an embodiment, the notch 56 forms a conically tapered portion 57. In an embodiment, the sleeve 14 is machined to form the notch 56 and the tapered portion 57. In an embodiment, as measured from a longitudinal axis A-A of the fastener 10, the tapered portion 57 has a slope in a range of about 5° to about 30°. In an embodiment, the tapered portion 57 has a slope of about 5°. In an embodiment, the tapered portion 57 has a slope of about 10°. In an embodiment, the tapered portion 57 has a slope of about 15°. In an embodiment, the tapered portion 57 has a slope of about 20°. In an embodiment, the tapered portion 57 has a slope of about 25°. In an embodiment, the tapered portion 57 has a slope of about 30°. In an embodiment, the tapered portion 57 is knurled, abraded, notched, or provided within any number of alternative frictional enhanced surfaces. The purpose and function of the tapered portion 57 shall be described hereinafter.

With continued reference to FIG. 1, in an embodiment, the head 46 of the sleeve 14 includes a plurality of recesses 58 disposed therein that are adapted to receive a plurality of protruding nibs of a nose of an installation tool, such as that shown in the '757 patent and the '842 patent. In an embodiment, the plurality of recesses 58 is disposed in the head 46 of the sleeve 14 in a generally circular orientation. In another embodiment, the recesses 58 can be formed in any configuration that allows the head 46 of the sleeve 14 to be engaged with the nibs of the installation tool, such as in the orientation of a hexagon, a square, a cross-slot configuration, or a single slot configuration.

Figure 2:
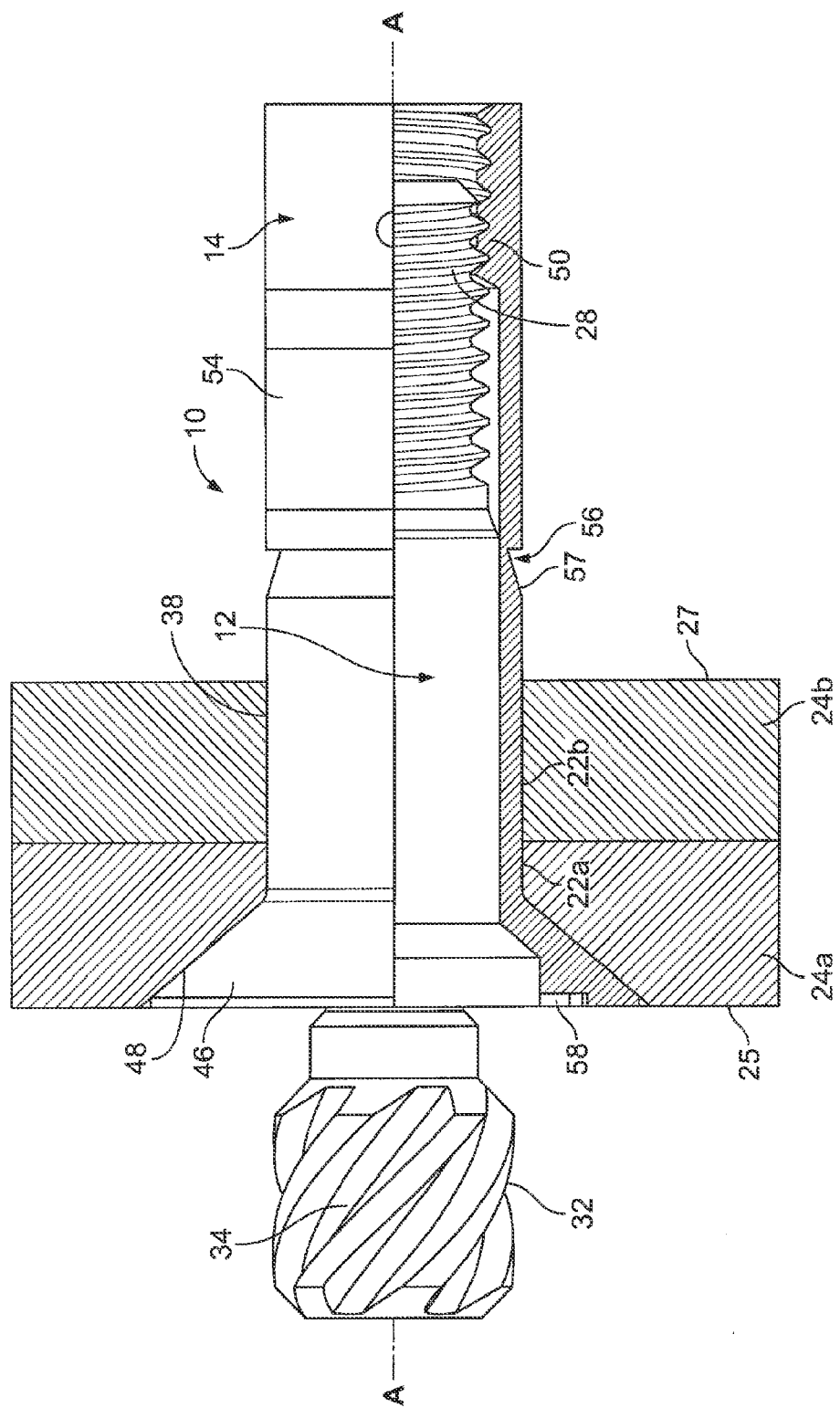
FIG. 2 is a partially cross-sectioned, side elevational view of the blind fastener shown in FIG. 1, the fastener being shown in an uninstalled position within the work pieces but at a minimum grip length.

In an embodiment, prior to installing the fastener 10 into the work pieces 24a, 24b, the fastener 10 is assembled. Referring to FIGS. 1 and 2, in an embodiment, the fastener 10 is assembled by inserting the core bolt 12 into the sleeve 14 and threading the threaded portion 28 of the core bolt 12 with the threaded portion 50 of the sleeve 14. In an embodiment, the fastener 10 is inserted through the openings 22a, 22b of the work pieces 24a, 24b, and the first head 46 of the sleeve 14 is received against the outer surface 48 of the accessible side 25 of the workpiece 24a, and at least a portion of the body 38 of the sleeve 14 projects outwardly from the workpiece 24b and is adjacent to the outer surface of the blind side 27 of the workpiece 24b. In an embodiment, the annealed portion 54 and the notch 56 and the tapered portion 57 extend beyond the outer surface of the blind side 27 of the workpiece 24b. In an embodiment, FIG. 1 shows the maximum grip of the fastener 10, while FIG. 2 shows the minimum grip of the fastener 10 for work pieces 24a, 24b that have less of a total thickness than those shown in FIG. 1.

Figure 3:
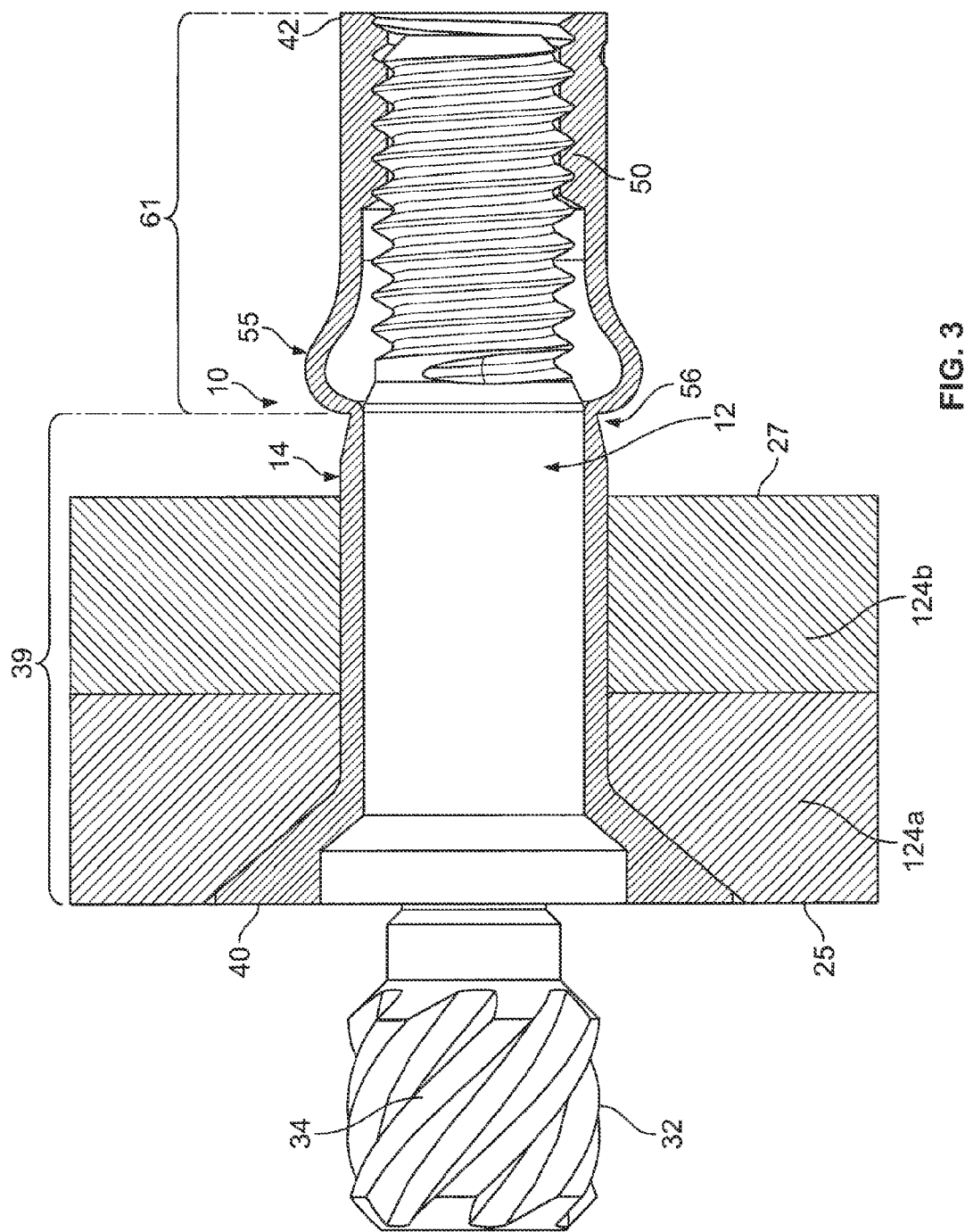
FIG. 3 is a partially cross-sectioned, side elevational view of the blind fastener shown in FIG. 1 being installed within the work pieces during a bulb formation step of a fastener installation sequence.

In an embodiment, a rotary installation tool having a nose assembly (not shown in the Figures) is provided to set the fastener 10. In an embodiment, the splines or threads 34 of the second head 32 of the core bolt 12 are engaged with complementary splines or threads of a driver of the tool (not shown in the Figures). In an embodiment, upon actuation of the tool by the end-user, the splined engagement between the core bolt 12 and nose assembly simultaneously pulls the nose assembly towards the fastener 10 during actuation of the tool to ensure proper engagement of the nibs with the recesses 58 and rotatably torques the core bolt 12 to effectively form the bulb 55, as shown in FIG. 3. In an embodiment, the formation of the bulb 55 commences at the diameter of the sleeve 14. In an embodiment, the formation of the bulb 55 occurs proximate to the notch 56. In an embodiment, formation of the bulb 55 starts in the same location on the sleeve 14, regardless of the structural grip (e.g., maximum grip, minimum grip, or therebetween), and, therefore, allowing the annealed portion 54 (as shown in FIGS. 1 and 2) to have a shorter width and be applied to a more targeted area on the sleeve 14. In an embodiment, the formation of the bulb 55 defines the body 38 as two segments: a bulbed portion 61, which extends from the bulb 55 to the second end 42 of the body 38, and a body portion 39, which extends from the bulb 55 to the first end 40 of the body 38. In an embodiment, rotation of the bulbed portion 61, and thus the internal threaded portion 50 of the sleeve 14, is prevented because the bulbed portion 61 and the body portion 39 remain integral during this stage of the installation of the fastener 10.

Figure 4:
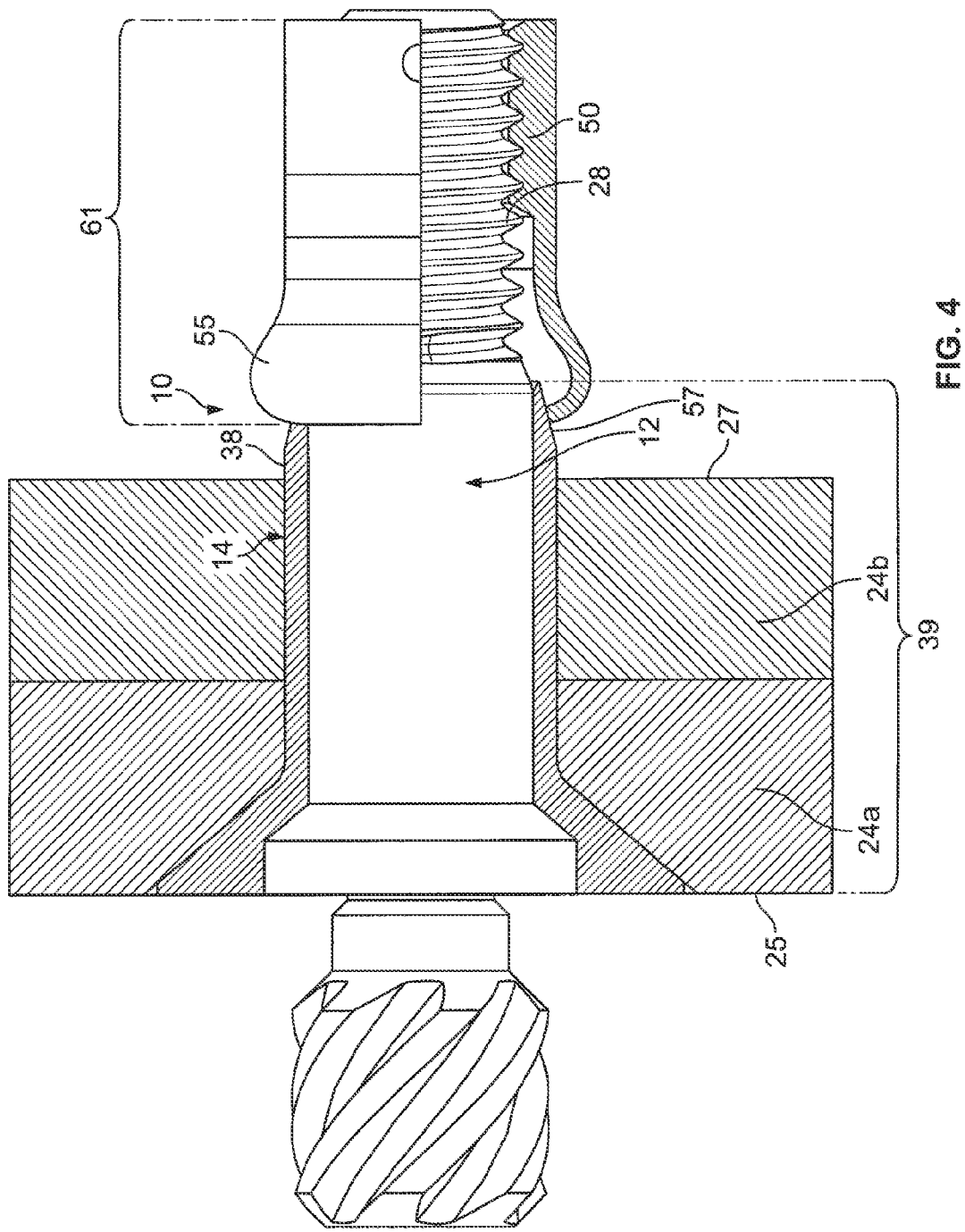
FIG. 4 is a partially cross-sectioned, side elevational view of the blind fastener shown in FIG. 3 being installed within the workpiece during a bulb shearing step of a fastener installation sequence.
Figure 5:
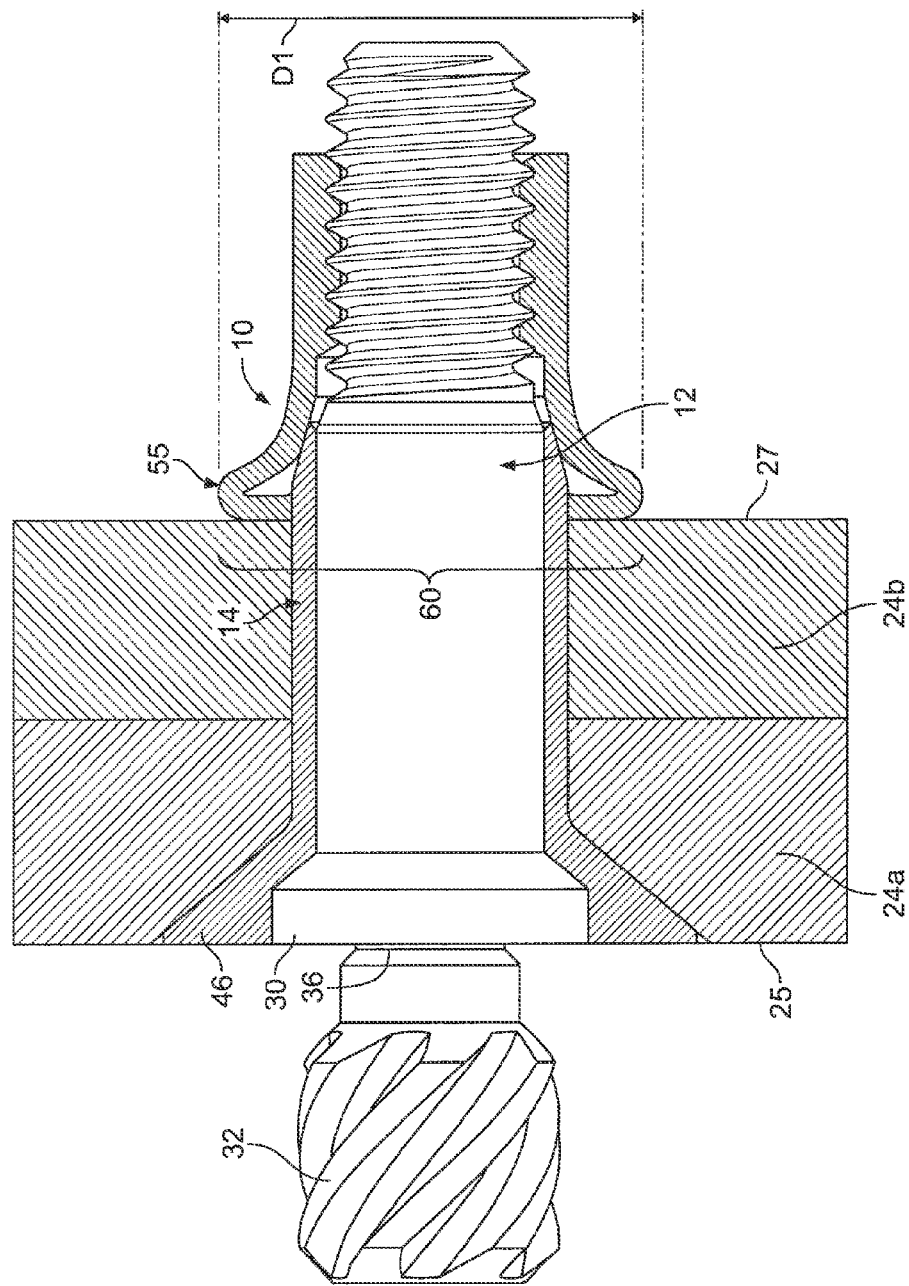
FIG. 5 is a partially cross-sectioned, side elevational view of the blind fastener shown in FIG. 4, the fastener being shown in an installed position at a maximum grip length.
Figure 6:
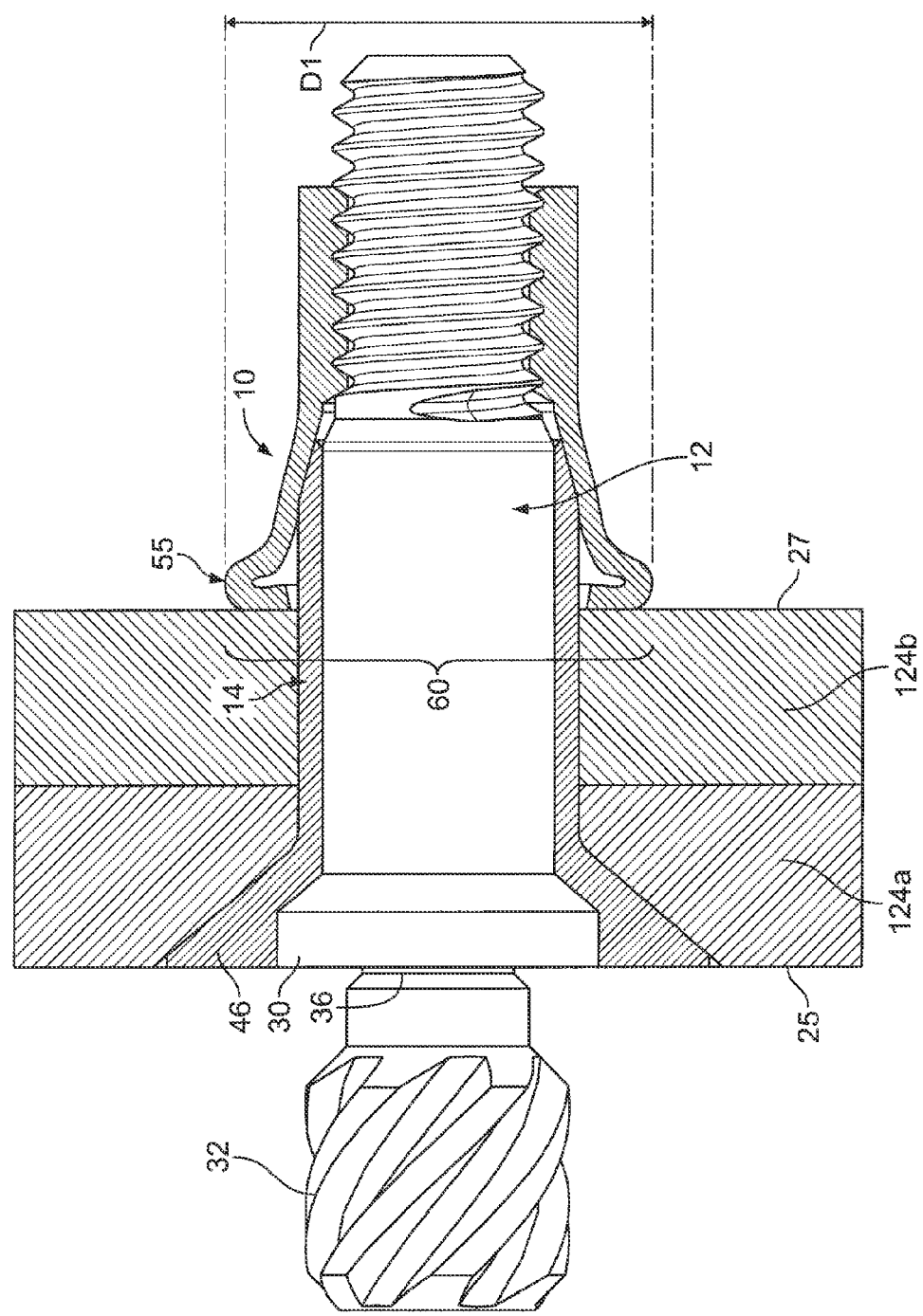
FIG. 6 is a partially cross-sectioned, side elevational view of the blind fastener shown in FIG. 2, the fastener being shown in an installed position but at a minimum grip length.

Referring to FIG. 4, when a selected axial force applied on the fastener 10 is reached, the bulbed portion 61 (and thus the bulb 55 and the threaded portion 50) of the sleeve 14 is sheared off the body 38 at a location proximate to the notch 56 and the tapered portion 57, thus forming the separate and distinct bulbed portion 61 and the body portion 39 (which is now the remaining portion of the body 38 after the bulbed portion 61 is sheared off). In an embodiment, when the bulbed portion 61 is sheared off, it is forced up the tapered portion 57. In an embodiment, as described above, the tapered portion 57 is provided with knurling, abrading, notching or frictional enhanced surfaces to promote engagement of the bulbed portion 61 with the body portion 39, and insure that the bulbed portion 61 and the core bolt 12 will not turn together upon rotation of the core bolt 12. Moreover, in an embodiment, after the bulbed portion 61 is sheared off the body 38, rotation of the bulbed portion 61 relative to the body portion 39 is prevented by friction due to the existence of the knurling, abrading, notching or frictional enhanced surfaces on the tapered portion 57. In an embodiment, the threaded portion 28 of the core bolt 12 continues to threadedly engage the threaded portion 50 of the sleeve 14, drawing the bulbed portion 61 along the body portion 39 and closer to the surface of the blind side 27 of the workpiece 24b. The diameter of the bulb 55 increases as the bulbed portion 61 is forced up the tapered portion 57, Referring to FIG. 5, in an embodiment, the bulb 55 is then forced against the blind side 27 of the workpiece 24b and flattens out, growing in diameter to its final shape which develops a footprint or bearing surface 60 against the blind side 27. In an embodiment, the footprint 60 has an external diameter that is at least 1.5 times the diameter of the fastener 10 (e.g., the nominal shank diameter of the fastener 10). In an embodiment, the footprint 60 has a diameter that is at least 2 times the diameter of the fastener 10. When the bulb 55 is fully formed, further rotation of the core bolt 12 ceases. At this point, a torsional load builds up in the core bolt 12 and the break neck groove 36 will fracture in torsional or rotational shear and the second head 32 will break off at the breakneck groove 36 (which shown in FIGS. 1, 5 and 6). In an embodiment, the head 30 of the core bolt will be flush with the head 46 of the sleeve 14. In an embodiment, the work pieces 24a, 24b are not exposed to high peak buckling loads during installation of the fastener 10. In an embodiment, since formation of the bulb 55 is initiated prior to the separation of the bulbed portion 61 from the body portion 38, the compressive load on the work pieces 24a, 24b is substantially reduced, and the indentations in the contact surface, created by bulb formation forces, are reduced. FIG. 6 shows the fastener 10 installed within the work pieces 124a, 124b, but at a minimum grip length.

FIGS. 7 through 9B illustrate another embodiment of a blind fastener 110. In an embodiment, the blind fastener 110 is a pull-type fastener. Elements shown in FIGS. 7 through 9B which correspond, either identically or substantially, to the elements described above with respect to the embodiment shown in FIGS. 1 through 6 have been designated by corresponding reference numerals increased by one hundred, respectively. Unless otherwise stated or shown in the Figures, the embodiment shown in FIGS. 7 through 9B is structured and functions in the same or a similar manner as the embodiments shown in FIGS. 1 through 6.

Referring to FIGS, 7 and 8, the blind fastener 110 includes a core bolt 112 and a sleeve 114 that is sized and shaped to receive the core bolt 112. In an embodiment, the sleeve 114 is of one-piece construction when the fastener 110 is within an initial stage of an uninstalled position. In an embodiment, the sleeve 114 is adapted to be separated into two portions or segments, which will be described in greater detail below, In an embodiment, the core bolt 112 includes an elongated shank 116 having a first end 118 and a second end 120 opposite the first end 118, and which is sized and shaped to be inserted within and extend through the sleeve 114. In an embodiment, the sleeve 114 is sized and shaped to be inserted within openings 122a, 122b of a plurality of work pieces 124a, and 124b, respectively. In an embodiment, the work piece 124a includes an accessible side 125, while the work piece 124b includes a blind side 127 opposite the accessible side 125. In certain embodiments, the work pieces 124a, 124b are made of aluminum, an aluminum alloy, other metallic alloys, composites, or combinations thereof.

Figure 8:
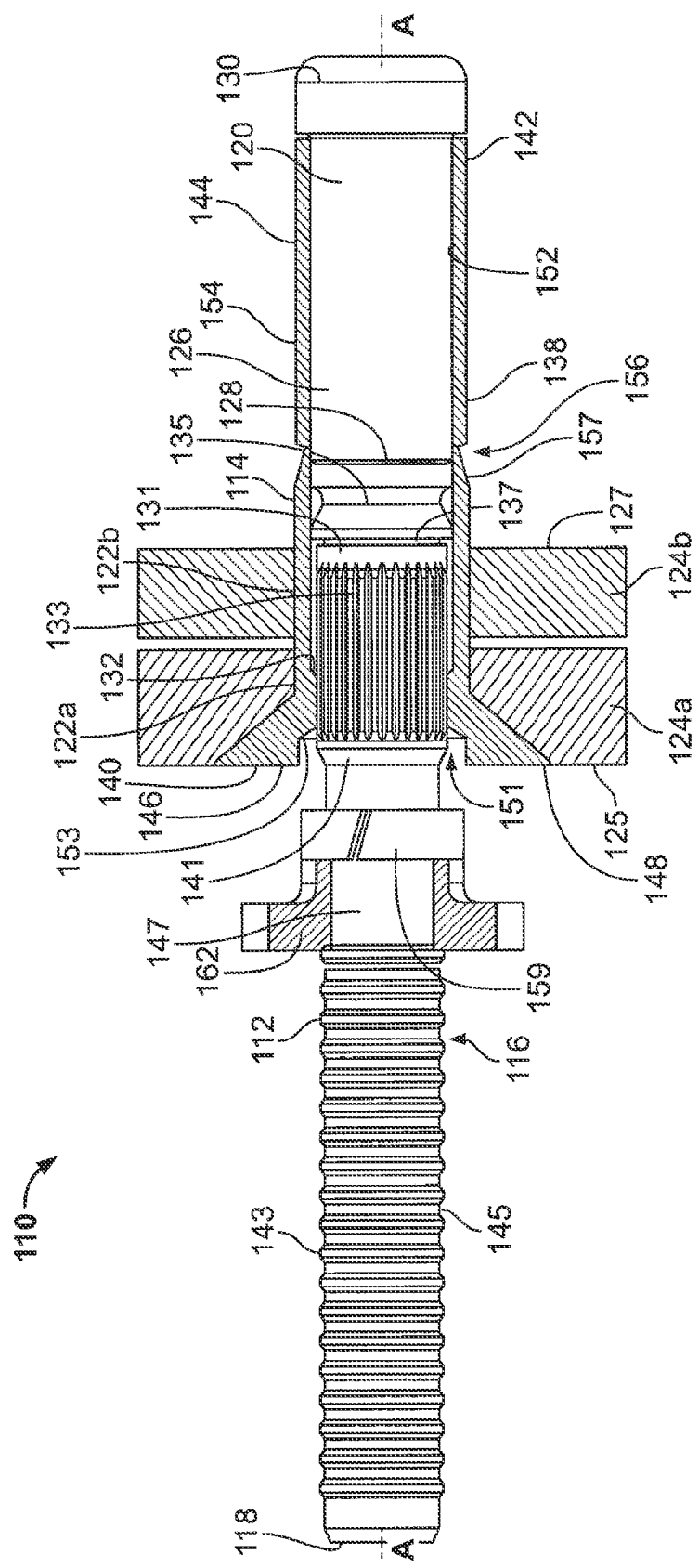
FIG. 8 is a cross-sectional view of the blind fastener shown in FIG. 7.

Referring to FIG. 8, in an embodiment, the shank 116 includes a smooth cylindrical shank portion 126 extending from the second end 120 to a transition portion 128 located intermediate the first and second ends 118, 120. In an embodiment, the shank 116 includes a second portion 131. In an embodiment, the second portion 131 includes knurling 133 extending longitudinally thereon, In an embodiment, an annular lock groove 135 is positioned intermediate the shank portion 126 and the second portion 131. In an embodiment, the lock groove 135 has a diameter that is smaller than the diameter of each the shank portion 126 and the second portion 131. In an embodiment, the lock groove 135 is defined by a first tapered portion, which is located proximate to the second portion 131 and tapers inwardly in a direction from the first end 118 towards the second end 120, and a second tapered portion, which is located proximate to the shank portion 126 and tapers inwardly in a direction from the second end 120 towards the first end 118. In an embodiment, a breakneck groove 137 is located intermediate the second portion 131 and the lock groove 135. In an embodiment, the shank 116 includes a smooth third portion 147, a transition portion 141 intermediate the second and third portions 131, 147, and a pull portion 143 extending from the third portion 147. In an embodiment, the pull portion 143 includes a plurality of annular grooves 145 for receiving a puller or collet jaws of an installation tool. In another embodiment, the pull portion 143 includes threads (not shown in the Figures). In an embodiment, the core bolt 112 includes a head 130 located at the second end 120 of the shank 116 and adjacent to the shank portion 126.

Figure 7:
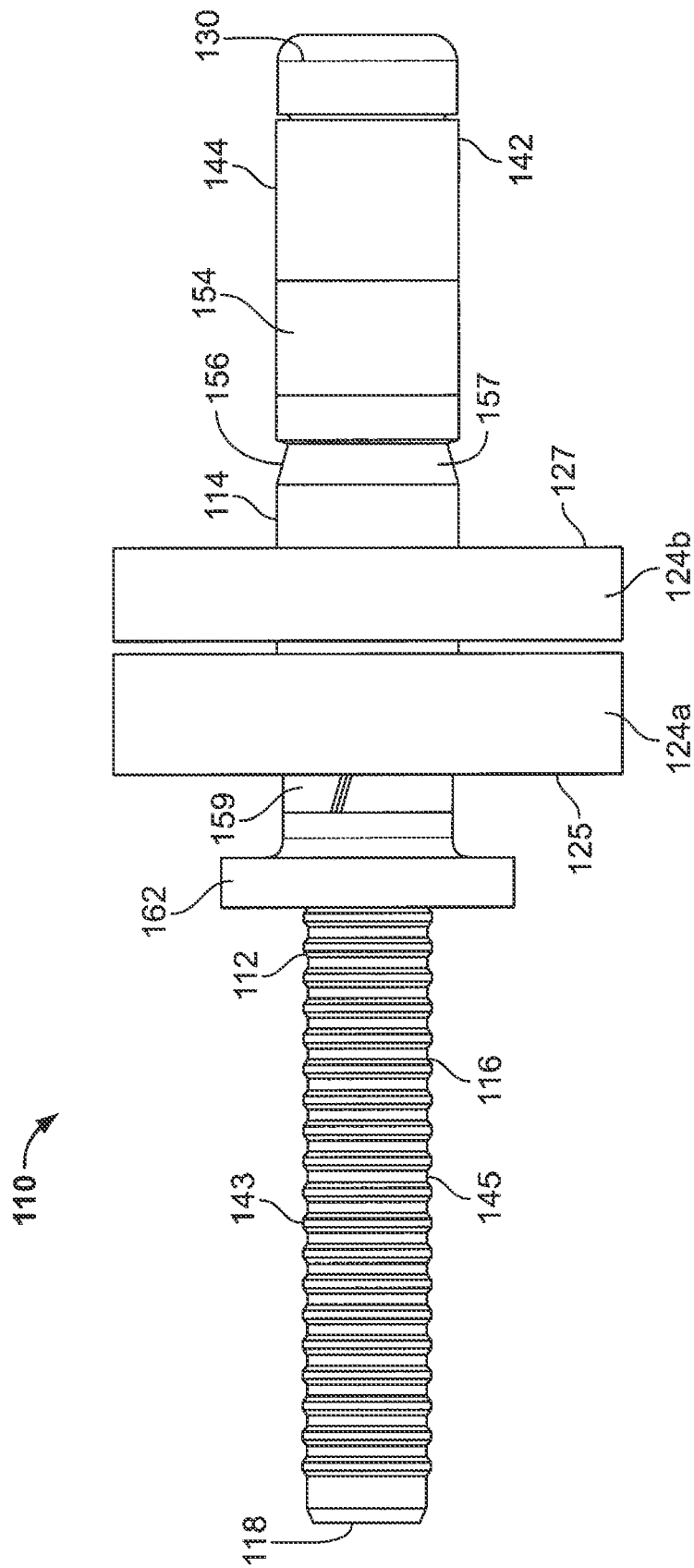
FIG. 7 is a side elevational view of a blind fastener in accordance with another embodiment, the fastener being shown in an uninstalled position within a plurality of work pieces.

Referring to FIGS. 7 and 8, in an embodiment, the sleeve 114 includes an elongated body 138 having a first end 140 and a second end 142 opposite the first end 140. In an embodiment, the head 130 of the core bolt 112 is juxtaposed with the second end 142 of the sleeve 114 when the core bolt 112 is installed within the sleeve 114. In an embodiment, the body 138 has a cylindrical shape and a smooth exterior surface 144. In certain embodiments, the body 138 has a diameter that provides a slight clearance fit or a press fit through the openings 122a, 122b of the work pieces 124a, 124b. In an embodiment, the sleeve 114 includes a head 146 located at the first end 140 of the body 138, In an embodiment, the head 146 of the sleeve 114 is sunk flush with an outer surface 148 of the accessible side 125 of the work piece 124a. In another embodiment, the head 146 protrudes from the outer surface 148 of the accessible side 125 of the work piece 124a. In an embodiment, the head 146 may include a round head, hex head or other suitable shape that is well known in the fastener art. In an embodiment, the head 146 includes an inner pocket 151 formed therein and terminates at an annular seat 153, whose purpose shall be described hereinafter.

With reference to FIG. 8, in an embodiment, the sleeve 114 has an internal smooth portion 152 extending intermediate the first and second ends 140, 142. In an embodiment, the internal smooth portion 152 of the sleeve includes a inwardly extending step 132. In an embodiment, an annealed portion 154 on the body 138 of the sleeve 114 is locally induction annealed in order to facilitate formation of a bulb 155 (see FIGS. 9A and 9B), which will be described below in further detail. In an embodiment, the annealed portion 154 additionally facilitates formation of the bulb 155 against the surface of the blind side 127 of the work piece 124b in all grip ranges of the fastener 110.

Referring back to FIGS. 7 and 8, in an embodiment, the exterior surface 144 of the sleeve 114 includes a tapered notch 156 formed therein and located intermediate the first and second ends 140, 142 of the sleeve 114. In an embodiment, the notch 156 forms a conically-shaped tapered portion 157. In an embodiment, as measured from a longitudinal axis A-A of the fastener 110, the tapered portion 157 has a slope in a range of about 5° to about 30°. In an embodiment, the tapered portion 157 has a slope of about 5°. In an embodiment, the tapered portion 157 has a slope of about 10°. In an embodiment, the tapered portion 157 has a slope of about 15°. In an embodiment, the tapered portion 157 has a slope of about 20°. In an embodiment, the tapered portion 157 has a slope of about 25°. In an embodiment, the tapered portion 157 has a slope of about 30°. In an embodiment, the tapered portion 157 is knurled, abraded, notched, or provided within any number of alternative frictional enhanced surfaces. The purpose and function of the tapered portion 157 shall be described hereinafter. In another embodiment, the internal smooth portion 152 of the sleeve 114 also includes a notch formed therein (not shown in the Figures). In an embodiment, the notch on the internal smooth portion 152 is smaller in size than the notch 157. In another embodiment, the internal smooth portion 152 of the sleeve 114 includes a notch formed therein, but does not include the notch 157 (not shown in the Figures).

Still referring to FIG. 8, the fastener 110 includes a lock ring 159 and a drive anvil 162 juxtaposed with the lock ring 159. In an embodiment, when the fastener 110 is in an uninstalled position, the lock ring 159 is fitted on the third portion 147 of the shank 116 of the core bolt 112. In an embodiment, when the fastener 110 is in an uninstalled position, a portion of the lock ring 159 is positioned within the inner pocket 151 of the head 146 of the sleeve 114 (not shown in the Figures), but it is shown in FIG. 8 positioned outside the inner pocket 151 so as allow for illustration of the features of the inner pocket 151. In an embodiment, when the fastener 110 is in an uninstalled position, the lock ring 159 engages frictionally the knurling 133 of the core bolt 112 so as to prevent the lock ring 159 from disengaging from the core bolt 112. In another embodiment, when the fastener 110 is in an uninstalled position, the drive anvil 162 engages frictionally the knurling 133 of the core bolt 112 so as to prevent the drive anvil 162 from disengaging from the core bolt 112. The purpose and function of the lock ring 159 and the drive anvil 162 shall be described hereinafter.

In an embodiment, as shown in FIGS. 7 and 8, prior to installing the fastener 110 into the work pieces 124a, 124b, the fastener 110 is assembled by inserting the core bolt 112 into the sleeve 114. In an embodiment, the knurling 133 of the core bolt 112 engages frictionally the step 132 of the sleeve 114 so as to prevent the core bolt 112 from disengaging the sleeve 114 when the fastener 110 is in an uninstalled position. In an embodiment, the fastener 110 is inserted through the openings 122a, 122b of the work pieces 124a, 124b, and the head 146 of the sleeve 114 is received against the outer surface 148 of the accessible side 125 of the work piece 124a, and at least a portion of the body 138 of the sleeve 114 projects outwardly from the work piece 124b and is adjacent to the outer surface of the blind side 127 of the work piece 124b. In an embodiment, the annealed portion 154 and the notch 156 and the tapered portion 157 extend beyond the outer surface of the blind side 127 of the work piece 124b. In an embodiment, FIG. 8 shows a minimum grip of the fastener 110.

Figure 9A:
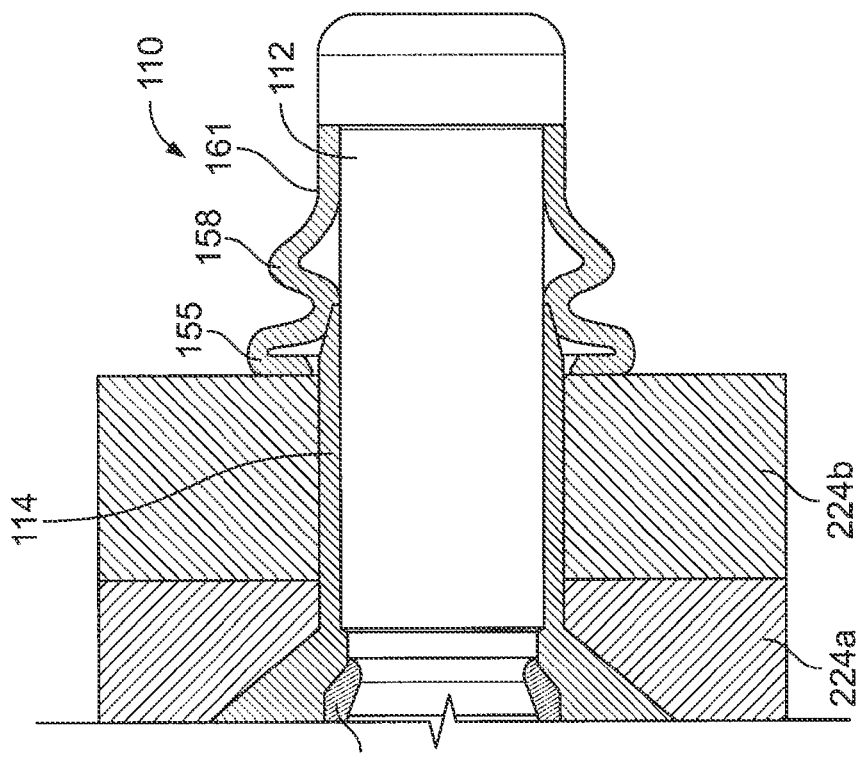
FIG. 9A is a partially cross-sectioned, side elevational view of the blind fastener shown in FIG. 8, the fastener being shown in an installed position and at a minimum grip length.

In an embodiment, a fastener installation tool (not shown in the Figures) is provided to set the fastener 110, In an embodiment, upon actuation of the tool by the end-user, the installation tool engages the annular grooves 145 of the pull portion 143 of the core bolt 112 and provides an axial force thereon. In an embodiment, the transition portion 128 and the transition portion 141 facilitate the advancement of the core bolt through the sleeve 114. In an embodiment, when the core bolt 112 is pulled through the sleeve 114, the head 130 of the core bolt 112 engages the second end 142 of the sleeve 114, which compresses the body 138 to form the bulb 155 (see FIG. 9A). In an embodiment, the formation of the bulb 155 commences at the diameter of the sleeve 114. In an embodiment, the formation of the bulb 155 occurs proximate to the notch 156. In an embodiment, formation of the bulb 155 starts in the same location on the sleeve 114, regardless of the structural grip (e.g., maximum grip, minimum grip, or therebetween), and, therefore, allowing the annealed portion 154 to have a shorter width and be applied to a more targeted area on the sleeve 114. In an embodiment, the formation of the bulb 155 defines the body 138 as two segments: a bulbed portion 161, which extends from the bulb 155 to the second end 142 of the body 138, and a body portion 139, which extends from the bulb 155 to the first end 140 of the body 138, Referring to FIG. 9A, when a selected axial force applied on the fastener 110 is reached, the bulbed portion 161 (and thus the bulb 155) of the sleeve 114 is sheared off the body 138 at a location proximate to the notch 156 and the tapered portion 157, thus forming the separate and distinct bulbed portion 161 and the body portion 139 (which is now the remaining portion of the body 138 after the bulbed portion 161 is sheared off). In an embodiment, when the bulbed portion 161 is sheared off, it is forced up the tapered portion 157. In an embodiment, as described above, the tapered portion 157 is provided with knurling, abrading, notching or frictional enhanced surfaces to promote engagement of the bulbed portion 161 with the body portion 139, and insure that the bulbed portion 161 and the core bolt 112 will not turn together upon rotation of the core bolt 112. Moreover, in an embodiment, after the bulbed portion 161 is sheared off the body 138, rotation of the bulbed portion 161 relative to the body portion 139 is prevented by friction due to the existence of the knurling, abrading, notching or frictional enhanced surfaces on the tapered portion 157. The diameter of the bulb 155 increases as the bulbed portion 161 is forced up the tapered portion 157. Referring to FIG. 9A, in an embodiment, the bulb 155 is then forced against the blind side 127 of the work piece 124b and flattens out, growing in diameter to its final shape which develops a footprint or bearing surface 160 against the blind side 127.

In an embodiment, and simultaneously with the formation of the bulb 155, the installation tool drives axially the drive anvil 161 against the lock ring 159 and forces the lock ring 159 into the inner pocket 151 and on the seat 153 of the head 146 of the sleeve 114. In an embodiment, the lock ring 159 deforms within the inner pocket 151 and engages the lock groove 135 of the core bolt 112. In an embodiment, the lock ring 159 secures the sleeve 114 to the core bolt 112 and, in turn, the fastener 110 secures the work pieces 124a, 124b to one another (see FIG. 9A). In an embodiment, once the fastener 110 secures the work pieces 124a, 124b to one another, an axial load builds up in the core bolt 112 and the breakneck groove 136 will fracture. In an embodiment, the second portion 131, third portion 147, and the pull portion 143, as a unitary piece, breaks off at the breakneck groove 136, and such piece is discarded, leaving the fractured end of the core bolt 112 flush (or substantially flush) with the side 125 of the work piece 124a (see FIG. 9A), In an embodiment, the drive anvil 161 is disposable.

Figure 9B:
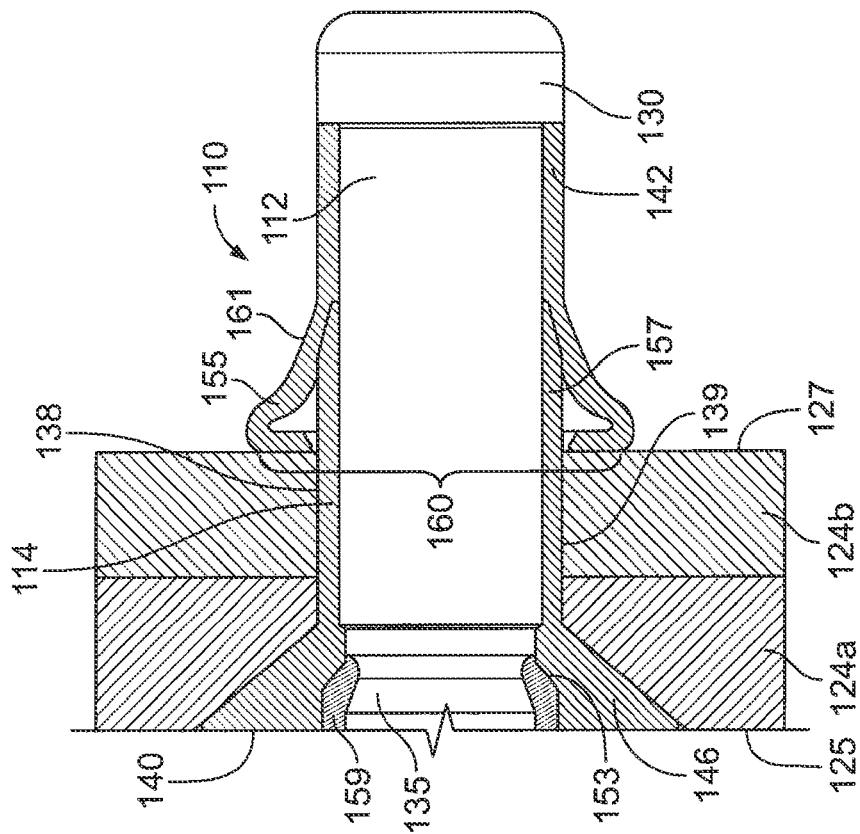
FIG. 9B is a partially cross-sectioned, side elevational view of the blind fastener shown in FIG. 8, the fastener being shown in an installed position and at a maximum grip length.

FIG. 9B shows the fastener 110 installed within the work pieces 224a, 224b, but at a minimum grip length. In an embodiment, the bulbed portion 161 includes a primary bulb 155 and a secondary bulb 158 formed adjacent to the primary bulb 155. In an embodiment, the secondary bulb 158 facilitates grip adjustment. In an embodiment, the fastener 110 is subject to a "fixed stroke," meaning that the amount of movement of the core bolt 112 through the sleeve 114 from the uninstalled position to the installed position is the same, regardless of the thickness of the work pieces (e.g., from minimum grip to maximum grip). With respect to the minimum grip, as shown in FIG. 9B, after the primary bulb 165 is formed, the remaining length of the material of the bulbed portion 161 forms into the secondary bulb 158. The primary bulb 155 and secondary bulb 158, thus, provide for a grip compensation feature, which enables the fastener 110 to be utilized at minimum grip.

It should be understood that the embodiments described herein are merely exemplary and that a person skilled in the art may make many variations and modifications without departing from the spirit and scope of the invention. In an embodiment, the fasteners 10, 110 are used in aerospace applications. In another embodiment, the fasteners 10, 110 are used in industrial applications. In an embodiment, the bulbed portion 61 is made of A-286 steel and the body portion 39 is made of Monel, and the bulbed portion 61 is tact welded to the body portion 39.

What is claimed is:

1. A fastener, comprising:
a core bolt having an elongated shank with a first end, a second end opposite the first end, a head located at the second end, and a pull portion located at the first end, the pull portion having a plurality of grooves; and
a sleeve having an elongated body with a fiat end, a second end opposite the first end of the elongated body, an exterior surface extending from the first end of the elongated body to the second end of the elongated body, a head located at the first end of the elongated body, and a tapered notch formed within the exterior surface intermediate the first and second ends of the elongated body and defined by a tapered portion,
wherein the core bolt is adapted to be installed within the sleeve such that the head of the core bolt is juxtaposed with the second end of the elongated body of the sleeve,
wherein the fastener is adapted to be installed within a plurality of work pieces such that the head of the sleeve engages an accessible side of one of the plurality of work pieces, and the second end of the elongated body of the sleeve extends from a blind side of another of the plurality of work pieces,
wherein during installation of the fastener within the plurality of work pieces, a bulb is formed on the elongated body of the sleeve, the bulb defining a portion of a bulbed portion which extends from the bulb to the second end of the elongated body of the sleeve,
wherein when a selected axial force applied to the fastener is reached, the bulbed portion separates from the elongated body and thereafter engages the tapered portion axially and in a direction towards the first end of the elongated body, thereby increasing the diameter of the bulb, and
wherein when the fastener is in an installed position, the bulb engages the blind side of the another of the plurality of work pieces.

2. The fastener of claim 1, wherein the bulb is formed prior to the separation of the bulbed portion from the elongated body.

3. The blind fastener of claim 2, wherein the sleeve includes an annealed portion to facilitate formation of the bulb.

4. The fastener of claim 2, wherein the bulbed portion is adapted to separate from the elongated body proximate to the tapered notch.

5. The fastener of claim 4, wherein the tapered portion includes a frictional enhanced surface that is adapted to inhibit rotation of the bulbed portion relative to the elongated body after the bulbed portion separates from the elongated body.

6. The fastener of claim 5, wherein the frictional enhanced surface includes knurling.

7. The fastener of claim 5, wherein the frictional enhanced surface includes abrading.

8. The fastener of claim 5, wherein the frictional enhanced surface includes a plurality of notches.

9. The fastener of claim 1, wherein the tapered portion has a slope in a range of about 5 degrees to about 30 degrees.

10. The fastener of claim 1, wherein the tapered portion has a slope of about 5 degrees.

11. The fastener of claim 1, wherein the tapered portion has a slope of about 10 degrees.

12. The fastener of claim 1, wherein the tapered portion has a slope of about 15 degrees.

13. The fastener of claim 1, wherein the tapered portion has a slope of about 20 degrees.

14. The fastener of claim 1, wherein the tapered portion has a slope of about 25 degrees.

15. The fastener of claim 1, wherein the tapered portion has a slope of about 30 degrees.

16. The fastener of claim 1, wherein the bulb includes a diameter that is at east one and one-half times a diameter of the fastener.

17. The fastener of claim 1, wherein the bulb includes a diameter that is at least two times a diameter of the fastener.

18. The fastener of claim 1, wherein the core bolt includes a breakneck groove located intermediate the first and second ends.

19. The fastener of claim 1, further comprising a lock ring, and wherein the head of the sleeve includes a pocket formed therein, the pocket being sized and shaped to receive the lock ring therein, wherein the core bolt includes a lock groove that is sized and shaped to receive the lock ring when the fastener s in its installed position.

20. The fastener of claim 1, wherein the elongated body of the sleeve is adapted to absorb a peak buckling load during installation of the blind fastener, thereby minimizing indentations in at least one of the plurality of work pieces.

* * * * *